US011758043B2

(12) United States Patent
Karia et al.

(10) Patent No.: US 11,758,043 B2
(45) Date of Patent: Sep. 12, 2023

(54) IDENTIFYING CALLER DETAILS FOR PROMOTIONAL VOICE COMMUNICATION

(71) Applicant: INTERNATIONAL BUSINESS MACHINES CORPORATION, Armonk, NY (US)

(72) Inventors: Jignesh K Karia, Thane (IN); Mukundan Sundararajan, Bangalore (IN); Pankaj Satyanarayan Dayama, Bangalore (IN); Vishal Awal, Mumbai (IN); Shilpa Shetty, Bangalore (IN); Neha Shah, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/507,406

(22) Filed: Oct. 21, 2021

(65) Prior Publication Data
US 2023/0130152 A1   Apr. 27, 2023

(51) Int. Cl.
*H04M 3/42* (2006.01)
*H04M 3/436* (2006.01)
(52) U.S. Cl.
CPC ..... *H04M 3/42059* (2013.01); *H04M 3/4365* (2013.01)
(58) Field of Classification Search
CPC .......... H04M 3/42059; H04M 3/4365
USPC .................................................. 379/142.06
See application file for complete search history.

(56) References Cited

U.S. PATENT DOCUMENTS

| | | | | |
|---|---|---|---|---|
| 10,389,872 | B1* | 8/2019 | Cox | H04M 3/382 |
| 10,785,369 | B1* | 9/2020 | Dashevskiy | H04M 3/2281 |
| 11,329,998 | B1* | 5/2022 | Shahidzadeh | H04L 63/126 |
| 2008/0126146 | A1* | 5/2008 | Benveniste | G06Q 30/0242 |
| | | | | 705/14.68 |
| 2014/0283055 | A1* | 9/2014 | Zahran | G06F 16/353 |
| | | | | 726/23 |
| 2015/0296081 | A1* | 10/2015 | Jeong | H04M 3/42042 |
| | | | | 379/142.01 |

(Continued)

OTHER PUBLICATIONS

Bartley, Kevin, "5 Best Practices for Setting Business Caller ID," https://www.onsip.com/voip-resources/smb-tips/5-best-practices-for-setting-business-caller-id, Aug. 2021, 6 pages.

(Continued)

*Primary Examiner* — Binh Kien Tieu
(74) *Attorney, Agent, or Firm* — Tutunjian & Bitetto, P.C.; Michael A. Petrocelli

(57) ABSTRACT

Origin information for promotional calls is provided by recording caller numbers for parties making the promotional calls; and receiving subscriber numbers for receiving the promotional calls. The subscribers numbers are stored in a database that also includes approved content for the promotional calls to be received by the subscriber. Caller numbers and approved content are matched for the subscriber with a call scrubber including a disturbed ledger. The distributed ledger recording a caller designation attached to the caller numbers indicative of a type for the promotional call. A promotional call is received by the subscriber. The caller identification for the subscriber indicates both the caller numbers and the caller designation that is indicative of the type for the promotional call.

20 Claims, 6 Drawing Sheets

(56) References Cited

U.S. PATENT DOCUMENTS

| | | | |
|---|---|---|---|
| 2016/0343100 A1* | 11/2016 | Davenport | G06Q 50/265 |
| 2017/0142252 A1* | 5/2017 | Bhupati | H04M 3/2281 |
| 2017/0353604 A1* | 12/2017 | Martine | H04M 3/53 |
| 2018/0054515 A1 | 2/2018 | White et al. | |
| 2018/0176368 A1 | 6/2018 | Algard et al. | |
| 2018/0295236 A1* | 10/2018 | Ansari | H04M 3/42042 |
| 2019/0335036 A1* | 10/2019 | Sharpe | H04M 15/56 |
| 2019/0363889 A1* | 11/2019 | Wang | H04L 9/3236 |
| 2020/0111037 A1* | 4/2020 | Mondal | H04W 4/025 |
| 2021/0075908 A1 | 3/2021 | Murphy et al. | |
| 2021/0092228 A1 | 3/2021 | Grabowski et al. | |

OTHER PUBLICATIONS

Mell, Peter, et al., "The NIST Definition of Cloud Computing," Sep. 2011, 7 pages.

* cited by examiner ated voice number starting with "140" for promotional communication.

IDENTIFYING CALLER DETAILS FOR PROMOTIONAL VOICE COMMUNICATION

BACKGROUND

The present invention generally relates to promotional communications and more particularly, in one example, to configuring communication transmissions to include content details to be reviewed by the receiver of the communication.

For a voice related promotional message, in currently existing systems any entity or organization that wants to engage into a promotional communication with a subscriber would reach out to a telemarketer who in turns has a registered voice number starting with "140" for promotional communication.

As the voice number is allocated to a telemarketer, the telemarketer can use the same number to make call on behalf of multiple organizations. Similarly, an organization can reach out to multiple telemarketer for its promotional communication.

The list of targeted subscriber is shared with the telemarketer by the organization and then the telemarketer can proceed with submission of request for voice call. In return, the telemarketer receives a token identifying the request, which can be submitted at later point of time to the operator for scrubbing and making the call.

SUMMARY

In accordance with an embodiment of the present invention, a method for providing origin information for promotional calls is described herein. The method for providing origin information for promotional calls including recording caller numbers, the caller numbers for parties making the promotional calls. The method further includes receiving subscriber numbers for receiving the promotional calls, wherein the subscriber numbers are stored in a database that also includes approved content for the promotional calls to be received by the subscriber. In some embodiments, a call scrubber included a distributer ledger matches caller numbers and approved content for the subscriber, and provides a caller designation attached to the caller numbers indicative of a type for the promotional call. The promotional call being received by the subscriber, wherein the caller identification for the subscriber indicates both the caller numbers and the caller designation that is indicative of the type for the promotional call.

In another aspect, a system is described for providing origin information for promotional calls. The system can include a hardware processor; and a memory that stores a computer program product, which, when executed by the hardware processor, causes the hardware processor to record caller numbers, the caller numbers for parties making the promotional calls. The system can also receive subscriber numbers for receiving the promotional calls, wherein the subscriber numbers are stored in a database that also includes approved content for the promotional calls to be received by the subscriber. The system may also match caller numbers and approved content for the subscriber with a call scrubber including a disturbed ledger, the distributed ledger recording a caller designation attached to the caller numbers indicative of a type for the promotional call. The system can also sent the promotional call to be received by the subscriber, wherein the caller identification for the subscriber indicates both the caller numbers and the caller designation that is indicative of the type for the promotional call.

In another aspect, the present disclosure provides a computer program product for providing origin information for promotional calls that includes a computer readable storage medium having computer readable program code embodied therewith, the program instructions executable by a processor to cause the processor to record caller numbers, the caller numbers for parties making the promotional calls. The computer program product can also receive, using the processor, subscriber numbers for receiving the promotional calls, wherein the subscriber numbers are stored in a database that also includes approved content for the promotional calls to be received by the subscriber. In some examples, the computer program product can also match, using the processor, caller numbers and approved content for the subscriber with a call scrubber including a disturbed ledger, the distributed ledger recording a caller designation attached to the caller numbers indicative of a type for the promotional call; and receive, using the processor, the promotional call by the subscriber, wherein the caller identification for the subscriber indicates both the caller numbers and the caller designation that is indicative of the type for the promotional call.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the disclosure provides a method and system to identify caller details for a promotional voice call. When a commercial communication happens, in most cases it is the telemarketer who initiates the call via an operator. The identity of organization for which the telemarketer can be working may be hidden, as there is no direct interaction with the subscriber. The subscriber can be the party receiving the call. Because the telemarketer is handling multiple organizations, it is not apparent to the subscriber for which organization the telemarketer is making a call.

A subscriber may have a preference set stating what kind of communication is preferred. However, due to many-to-many mapping, it opens up areas of preference violation. For example, to a subscriber while receiving a voice call, only the telemarketer calling number shows up on a caller identification. Same, number can be seen for varied kind of content. As a subscriber, even with a specific preference set, the subscriber may not be willing to accept a call based on the number of the telemarketer. But, the call could actually be for an organization for which a subscriber has given consent and is looking forward for the call.

The methods, systems and computer program products of the present disclosure can provide a system that generates a content/intent name (CName) which would be used during the call, and displayed to the subscriber. This content intent name (CName)(or content listing intent (CLI) name) gives an indication on the organization and the content type of the call, so as to provide a subscriber with more about the call, and thus eliminating chances of missing an interested call, and also from marketing not loosing on a target customer.

Figure 1:
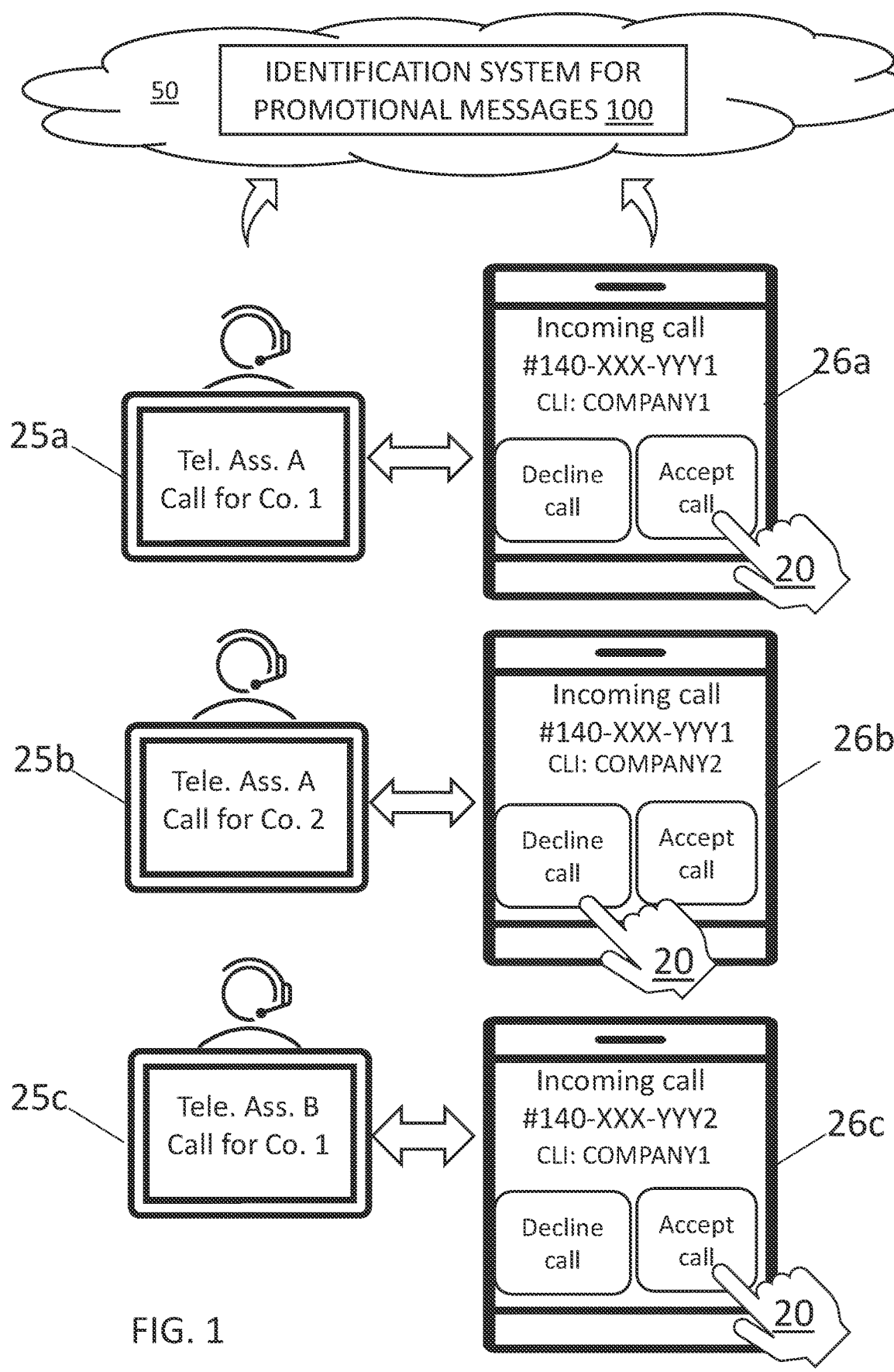
FIG. 1 is an illustration of an example environment illustrating promotional voice calls in which the methods and systems of the present disclosure can identify caller details, in accordance with some embodiments of the present disclosure.
Figure 2:
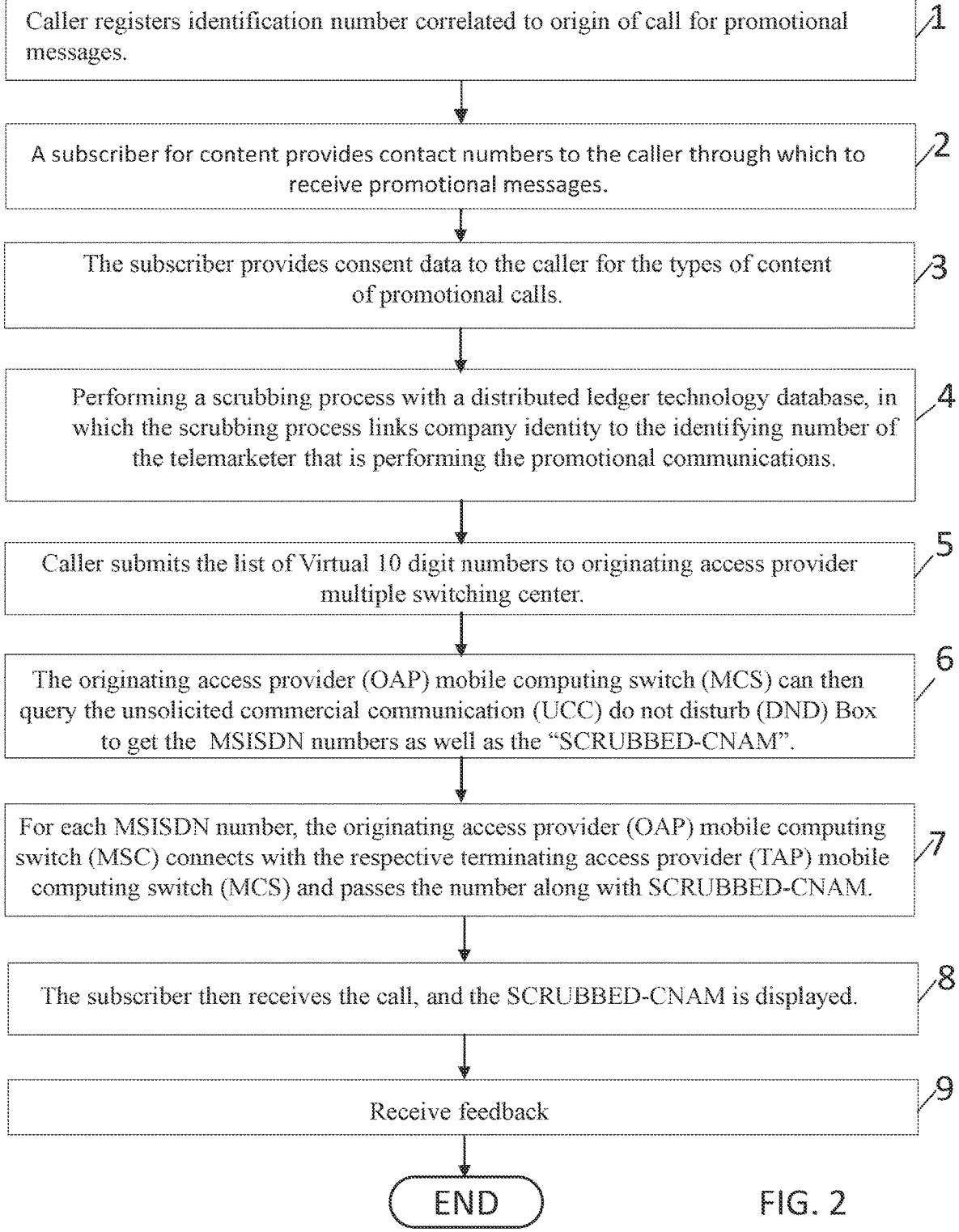
FIG. 2 is a flow/block diagram showing one embodiment a method to identify caller details for a promotional voice call, in accordance with some embodiments of the present disclosure.
Figure 3:
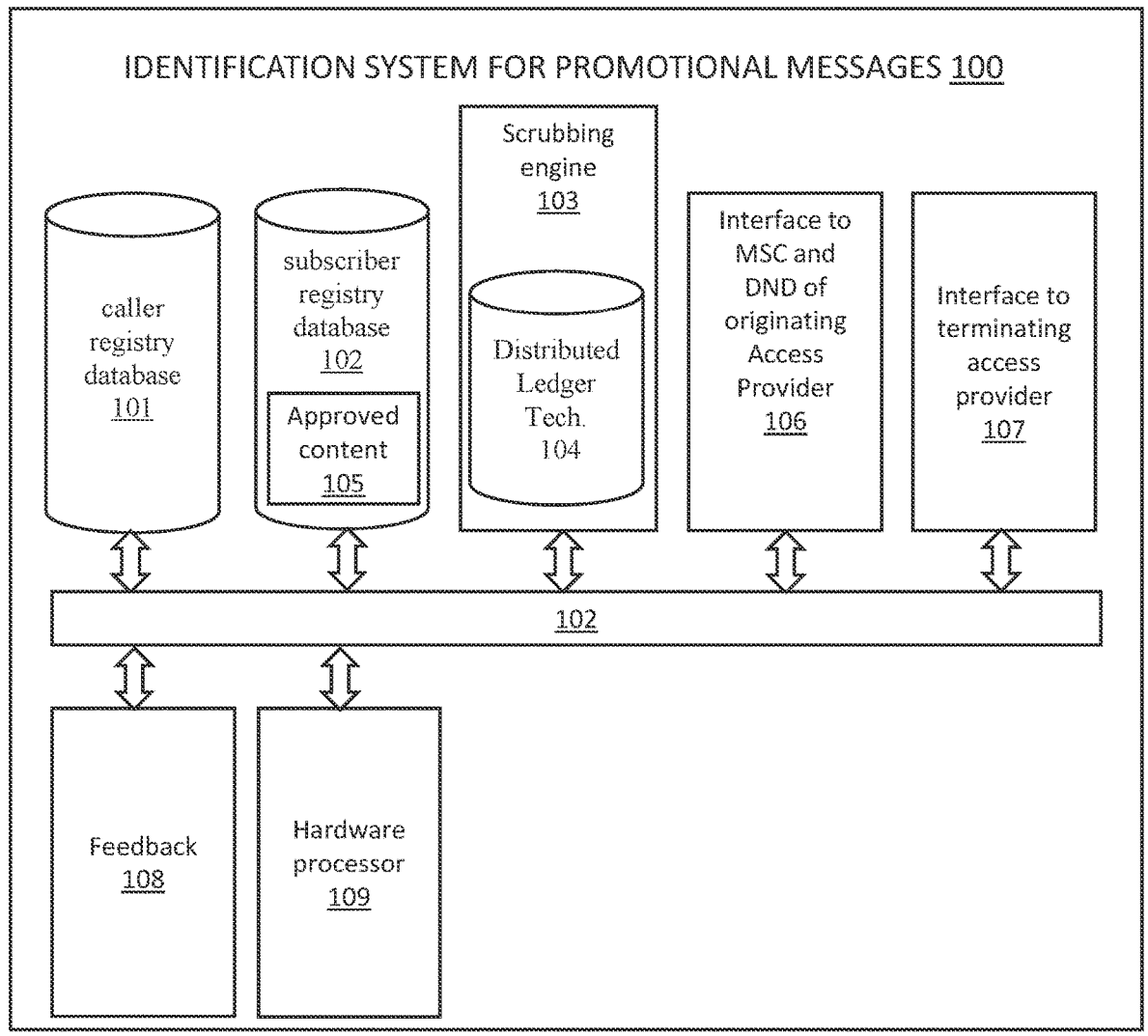
FIG. 3 is a block diagram depicting one embodiment of a system to identify caller details for a promotional voice call, in accordance with some embodiments of the present disclosure.

The systems, methods and computer program products are now described with more detail with reference to FIGS. 1-6. FIG. 1 illustrates one example environment in which the methods and systems of the present disclosure can identify caller details from promotional voice calls. FIG. 2 is a flow/block diagram showing one embodiment a method to identify caller details for a promotional voice call. FIG. 3 illustrates embodiment of a system that can function in the method depicted in FIG. 2 for providing caller details from promotional voice calls The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a commercial voice call environment. In one example, a first telemarketer 25*a*, e.g., telemarketer A, makes a promotional call on the behalf of a first organization, e.g., company 1, after a telemarketer 25*a* passes through a scrubbing process to the subscriber who refers to receive a communication from company 1. In another example, a second telemarketer 25*b*, e.g., telemarketer A, makes a promotional call on behalf of a second company, e.g., company 2, also after passing through the scrubbing process. In both instances, the receiver 30 of the telemarketers 25*a*, 35*b* calls, i.e., the subscriber for promotional calls, is not provided any information regarding the content of the call, i.e., for what company the call is being made. The receiver 30 of the telemarketer 25*a*, 25*b* calls may get information on the telemarketer, by viewing the telephone number of the call, because telemarketer typically have a specific number sequence (e.g., 140-xxx-yyy1, as depicted in FIG. 1) for their telephone number. This can cause a subscriber 30 for promotional calls to not pick up calls that their intending to receive information from. For example, the subscriber 30 can recognize the number of the telemarketer 25*a*, 25*b* making the call, and noting the call is coming from a telemarketer that is making calls from companies they may not be requesting content from. However, that same telemarketer 25*a*, 25*b* may also be calling for companies that the subscriber 30 is waiting or a promotional call from. Ignoring calls based on the telemarketers number 25*a* 25*b* can result in the subscriber missing the promotion they are intending to receive.

Referring to FIG. 1, the methods, systems and computer program products described herein employs an identification system for promotional messages 100 that includes a distributed ledger technology solution, e.g., blockchain memory, that follows a defined nomenclature across telemarketers to specify the content of the promotion, e.g., CLI/Cname, of the call, which provides information on the organization and the content of the call. For example, when the first telemarketer 25*a*, telemarketed associate A, is calling for the first company, e.g., company 1, the identification system for promotional messages 100 provides that the caller ID on the recipient's 30 communication device, .e.g., displayed on the screen of their mobile phone and/or tablet. For example, the caller ID may display CLI: company 1, as illustrated by 26*a*, or the caller ID may display CLI: company 2, as illustrated by 26*b*. Therefore, the identification system for promotional messages 100 can provide to the subscriber 30 both the phone number of the telemarketer 25*a*, 25*b*, 25*c*, and the identity for the content of the promotion company, e.g., company 1, company 2 and company 3. In some examples, this can be advantageous to a subscriber/recipient 30, because no matter who the telemarketer that is calling, the recipient 30 is getting information on the content of the promotion, e.g., the identity for which the promotion is for. For example, a third telemarketer 25*c* may have a different phone number than the first and second telemarketers 25*a*, 25*b*, however, the recipient 30 will still be able to determine that the call is for a promotion that they are intending to receive, because they can see the identity for the entity providing the promotion, i.e., company 1 or company 2.

The identification system for promotional messages 100 that includes a distributed ledger technology solution, e.g., blockchain memory, can provide a reliable principal entity name tagging for an incoming promotional voice call by telemarketers based on the scrubbing process for all consumer devices that can display CNAM/alternate business label. The Caller Name (CNAM) is a feature that displays your Name or Company Name on the Caller ID display of the party you are calling. When it is set up, your Caller ID Name would display as text along with your Caller ID Number. The identification system for promotional messages 100 provides a method to enable "context-intent" labelling in CNAM. More specifically, the system can convert the CNAM to a business label that can be easily consumed by the receiving party. The context-intent labeling may indicate the party from which the promotion is being offered. This is not the telemarketer, but is instead the company for which the telemarketer is marketing a product or service. For example, if a bank is offering a mortgage or loan service, and a telemarketer is contacting subscribers/recipients 30 to market those services, the context-intent labeling provided by the system 100 may identify the bank offering the mortgage or loan service, in this example.

The system can also enable & setup automatic business-based filters for telemarketing calls in lieu of Do Not Disturb (DND)/call blocking functionality. The system can also forward calls reliably based on principal entity identification to personal digital conversation assistants based on filters & obtaining summary/transcripts. In some embodiments, the principal entity name tagging is based on the conversation template provided by the telemarketer and consent data of the customer captured on the distributed ledger maintained by multiple telecom operators.

FIG. 2 depicts one embodiment a method to identify caller details for a promotional voice call, e.g., by using the an identification system for promotional messages 100 that includes a distributed ledger technology solution, e.g., blockchain memory. At block 1, the method may begin with the caller, e.g., telemarketer 25a, 25b, 25c, registering identification number correlated to origin of call for promotional messages. The original of call being a number correlated to the party making the call, e.g., the telemarketer 25a, 25b, 25c. For example, the caller, e.g., telemarketers 25a, 25b, 25c can register a "140" series number. The numbers are registered with the identification system for promotional messages 100 that includes a distributed ledger technology solution, e.g., blockchain memory, and stored in a registry database for caller, e.g., telemarketer 25a, 25b, 25c, call numbers, e.g., telephone numbers. Block 1 can be a one time step for setting up the method.

FIG. 3 depicts one embodiment of a system to identify caller details for a promotional voice call 100. The caller registry database 101 depicted as a memory storage component of the system 100 depicted in FIG. 3 may store the caller information that is collected in block 1 of FIG. 2.

Referring to FIG. 2, in a following step, the method can continue with an entity, e.g., a subscriber 30 (receiver of promotional calls), providing a list of mobile numbers to the caller, e.g., telemarketer 25a, 25b, 25c, for making promotional voice calls. For example, block 2 of FIG. 2 can include a subscriber 30 for content provides contact numbers to the caller through which to receive promotional messages.

Referring to FIG. 3, similar to the caller registry database 101, the system to identify caller details for promotional voice calls 100 also includes a subscriber registry database 102. In some examples, the subscriber registry database 102 include the contact numbers for the subscribers 20, e.g., parties that have signed up to receive promotional offers, which are collected at block 2 of the method described in FIG. 2.

At block 3, the method can continue with the subscriber 30 provides consent data to the caller for the types of content for promotional calls. For example, the subscriber 30 may be interested in receiving promotions on retail offers, home services, financial services, travel related services, transportation related services, etc. The aforementioned services and goods are only some examples of the types of goods and services that are suitable for the methods, systems and computer program products that are within the scope of the present disclosure. The consent data for the subscribers 30 can be saved by the system 100 in the subscriber registry database 102 along with the numbers correlated to the subscribers 30. For example, the subscriber registry database 102 may include an approved content module 105.

Block 4 of the method depicted in FIG. 2 includes performing a scrubbing process with a distributed ledger technology database, in which the scrubbing process links company identity (or another identifier illustrating the content of a promotional call) to the identifying number, e.g., phone number, of the telemarketer that is performing the promotional communications, e.g., promotional phone calls. FIG. 3 illustrates a scrubbing engine 103 for performing this process step. The scrubbing engine includes a distributed ledger technology database 104. In some examples, the distributed technology database 104 may be provided by blockchain memory.

The scrubbing process of block 4 can provide a "SCRUBBED-CNAM" based on the consent data of principal subscriber 30 appended with a random 4 digit string. The "SCRUBBED-CNAM" is stored in the DLT against this scrubbing request. CNAM is the acronym for Caller ID Name. CNAM databases (a.k.a. "Line Information Databases") are official, authoritative sources where the CNAM text data is recorded for any given phone number. There are multiple CNAM database providers that maintain these centralized records.

The scrubbing process also includes sharing the virtual 10 digit number with the caller, e.g., telemarketer 25a, 25b, 25c.

Turning to block 5 of the method illustrated by FIG. 2, the caller submits the list of Virtual 10 digit numbers to the originating access provider (OAP) mobile switching center (MSC). The originating access provider is the access provided that has provided the telecom resources to the telemarketer 25a, 25b, 25c.

An access provider means the operator to whose network, a line is directly connected and over which services are supplied. The mobile switching center (MSC) is the a part of the GSM/CDMA network system. It acts as a control center of a Network Switching Subsystem (NSS). The MSC connects calls between subscribers by switching the digital voice packets between network paths. It also provides information needed to support mobile service subscribers.

The MSC is stationed between the base station and the Public Switched Telephone Network (PTSN). All mobile communications are routed from the base station through the MSC. The MSC is responsible for handling voice calls and SMS including other services like FAX. The MSC initiates call setup between subscribers and is also responsible for real time pre-paid billing and account monitoring.

Block 6 of the method depicted in FIG. 2 can include the originating access provider (OAP) mobile switching center (MSC) querying the Unsolicited Commercial Communication (UCC) Do Not Disturb (DND) registry to get the Mobile Station International Subscriber Directory Number (MSISDN) numbers as well as the "SCRUBBED-CNAM". The scrubbed CNAM was created in block 4.

MSISDN is a number uniquely identifying a subscription in a Global System for Mobile communications or a Universal Mobile Telecommunications System mobile network. It is the mapping of the telephone number to the subscriber identity module in a mobile or cellular phone.

The MSISDN and international mobile subscriber identity (IMSI) are two important numbers used for identifying a mobile subscriber. The IMSI is stored in the SIM (the card inserted into the mobile phone), and uniquely identifies the mobile station, its home wireless network, and the home country of the home wireless network. The MSISDN is used for routing calls to the subscriber. The IMSI is often used as a key in the home location register ("subscriber database") and the MSISDN is the number normally dialed to connect a call to the mobile phone. A SIM has a unique IMSI that does not change, while the MSISDN can change in time, i.e. different MSISDNs can be associated with the SIM.

The MSISDN follows the numbering plan defined in the International Telecommunication Standard Sector recommendation E.164.

The Do Not Disturb (DND) registry ensures that a subscriber does not receive any calls or SMS promotions/messages from any sort of telecommunications service that they do not approve of. The primary objective is to curb Unsolicited Commercial Communication (UCC).

Referring to FIG. 3, the system includes an interface 106 to the mobile switching center (MSC) and the do not disturb (DND) box. Through this interface the system 100 can be provided the MSISDN numbers and information of the content that the subscriber 30 wishes and does not wish to be provided by promotional offers, e.g., promotional offers delivered by voice communication.

Referring to FIG. 3, the scrubbing engine 103 produces the numbers for the callers 25a, 25b, 25c including the appended content indicating the type of promotion for the caller, e.g., telemarketer, is making the call. The interface 106 with the MSC of the originating access provider and the DND box provides additional information, e.g., the MSISDN number and preference content for the subscribers, that is used in combination with the number configured by the scrubbing engine 103 to deliver directed promotional messages to subscribers having content preferences.

Referring to FIG. 2, at block 7, the method further continues with for each MSISDN number, the OAP MSC connects with respective terminal access provider (TAP) mobile switching center (MSC) and passes the number along with SCRUBBED-CNAM. The Terminating Access Provider (TAP) means the Access Provider on whose network the subscriber receiving the commercial communication is registered. Referring to FIG. 3, the system 100 may include an interface 107 through which for each MSISDN number, the SCRUBBED-CNAM is provided for deliver from the OAP MSC to the terminating access provider.

For every request, if the file is uploaded for scrubbing on DLT, DLT generates a special "SCRUBBED-CNAM" and stores it on the ledger. Whenever Telemarketer contacts OAP MSC with Virtual 10 digit Number file, OAP MSC queries the UCC DND BOX to get the "SCRUBBED-CNAM" along with 10 digit MSISDN number. The scrubbed-CNAM may include the following information: the customers mobile number, the telemarketer calling number, the brand entity identifier (who's promotion), telemarketer identification, template identifier, call category (promotional/service), the total number of customers called, and promotional call details (content, sample audio file).

Referring to block 8 of FIG. 2, the method may continue with the subscriber 30 receiving a promotional call. When the subscriber 30 receives the promotional call, the SCRUBBED-CNAM is displayed to the subscriber and UCC BC is displayed as the source that has identified this caller. (what is UCC BC stand for?). The Scrubbed-CNAM includes data indicating the content of the promotional call, such as from who the promotion is being offered, e.g., company 1 or 2, as depicted in FIG. 1.

In some embodiments, the subscriber 30 decides to receive the call, however, the actual content is not as per the displayed promotion category, the subscriber can raise a complaint with TAP. In some embodiments, the TAP can query the DLT to check the Scrubbed request. TAP can also analyze to call content to see if it matches the content template.

FIG. 3 depicts one embodiment of a system 100 for providing origin information for promotional calls. The system 100 includes a hardware processor 109; and a memory that stores a computer program product. The computer program product which, when executed by the hardware processor, causes the hardware processor to record caller numbers (saved in the caller registry database 101) for parties making the promotional calls; and receive subscriber numbers for receiving the promotional calls. The subscriber numbers are stored in a database (subscriber registry database 102) that also includes approved content for the promotional calls to be received by the subscriber. The system 100 can match caller numbers and approved content for the subscriber with a call scrubber 103 including a disturbed ledger 104, the distributed ledger 104 recording a caller designation attached to the caller numbers indicative of a type for the promotional call. The system 100 can also send the promotional call from the caller to the subscriber, wherein the caller identification for the subscriber indicates both the caller numbers and the caller designation that is indicative of the type for the promotional call.

Figure 4:
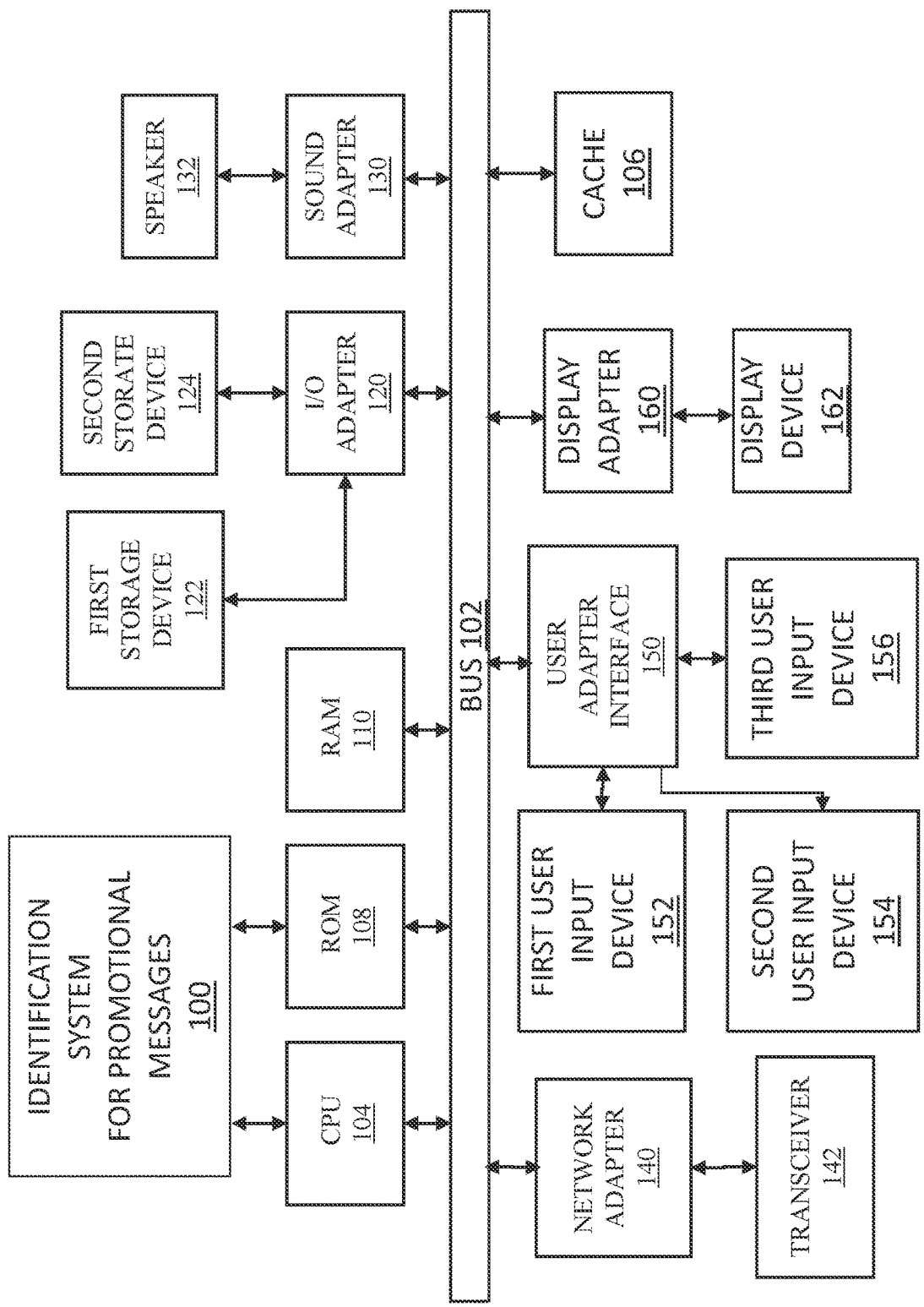
FIG. 4 is a block diagram illustrating a system that can incorporate the system to identify caller details for a promotional voice call that is depicted in FIG. 3, in accordance with one embodiment of the present disclosure.

FIG. 4 illustrates a processing system 400 used by or comprised by the system 100 of FIG. 3 for providing origin information for promotional calls, in accordance with the methods and systems described above in FIGS. 1-3. The bus 102 interconnects the plurality of components for the system 200 described above with the components depicted in the computer system 400 depicted in FIG. 4.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 4 shows the computer system 400 as a particular configuration of hardware and software, any configuration of hardware and software, as would be known to a person of ordinary skill in the art, may be utilized for the purposes stated supra in conjunction with the particular computer system 100 of FIG. 4. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for providing origin information for promotional calls. The non-transitory computer readable program when executed on a computer causes the computer to perform the steps of recording, using a processor, caller numbers, the caller numbers for parties making the promotional calls. The computer program product can also receive, using the processor, subscriber numbers for receiving the promotional calls, wherein the subscriber numbers are stored in a database that also includes approved content for the promotional calls to be received by the subscriber. The computer program product can also match, using the processor, caller numbers and approved content for the subscriber with a call scrubber including a disturbed ledger, the distributed ledger recording a caller designation attached to the caller numbers indicative of a type for the promotional call. The computer program product can also send, using the processor, the promotional call from the caller to the subscriber, wherein the caller identification for the subscriber indicates both the caller numbers and the caller designation that is indicative of the type for the promotional call.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 5:
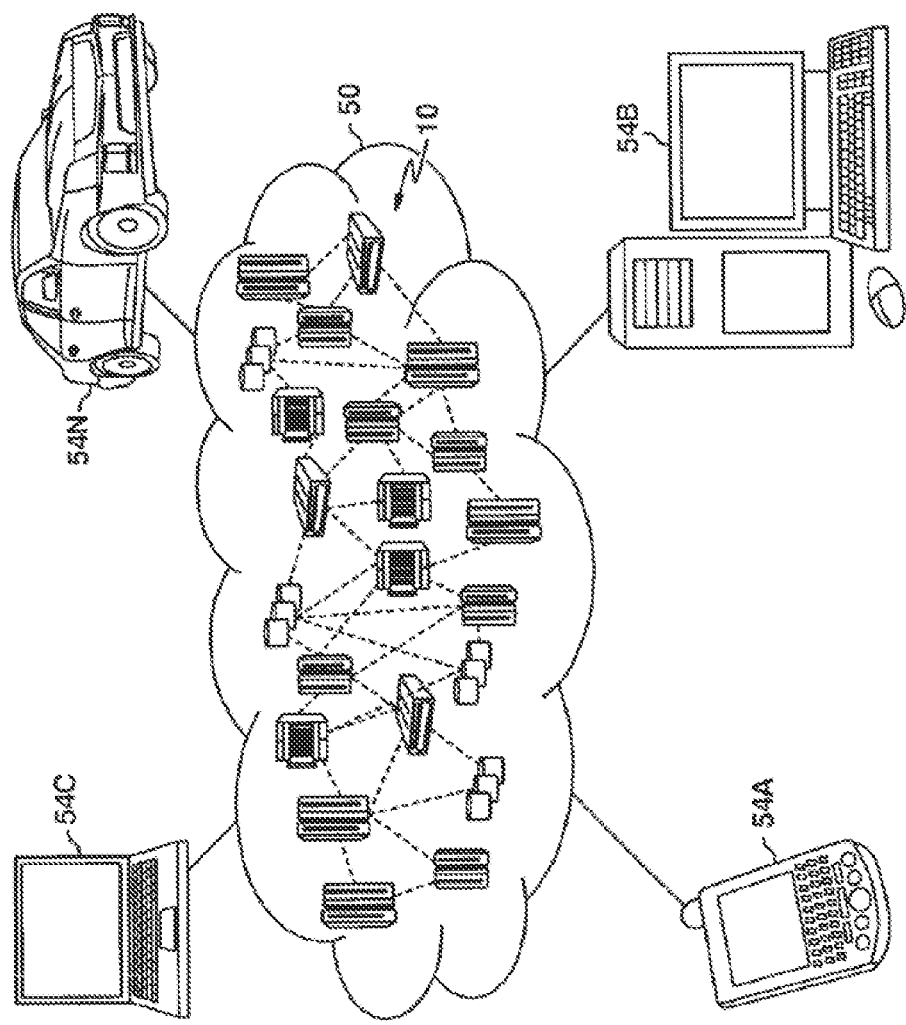
FIG. 5 depicts a cloud computing environment according to an embodiment of the present disclosure.

Referring now to FIG. 5, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
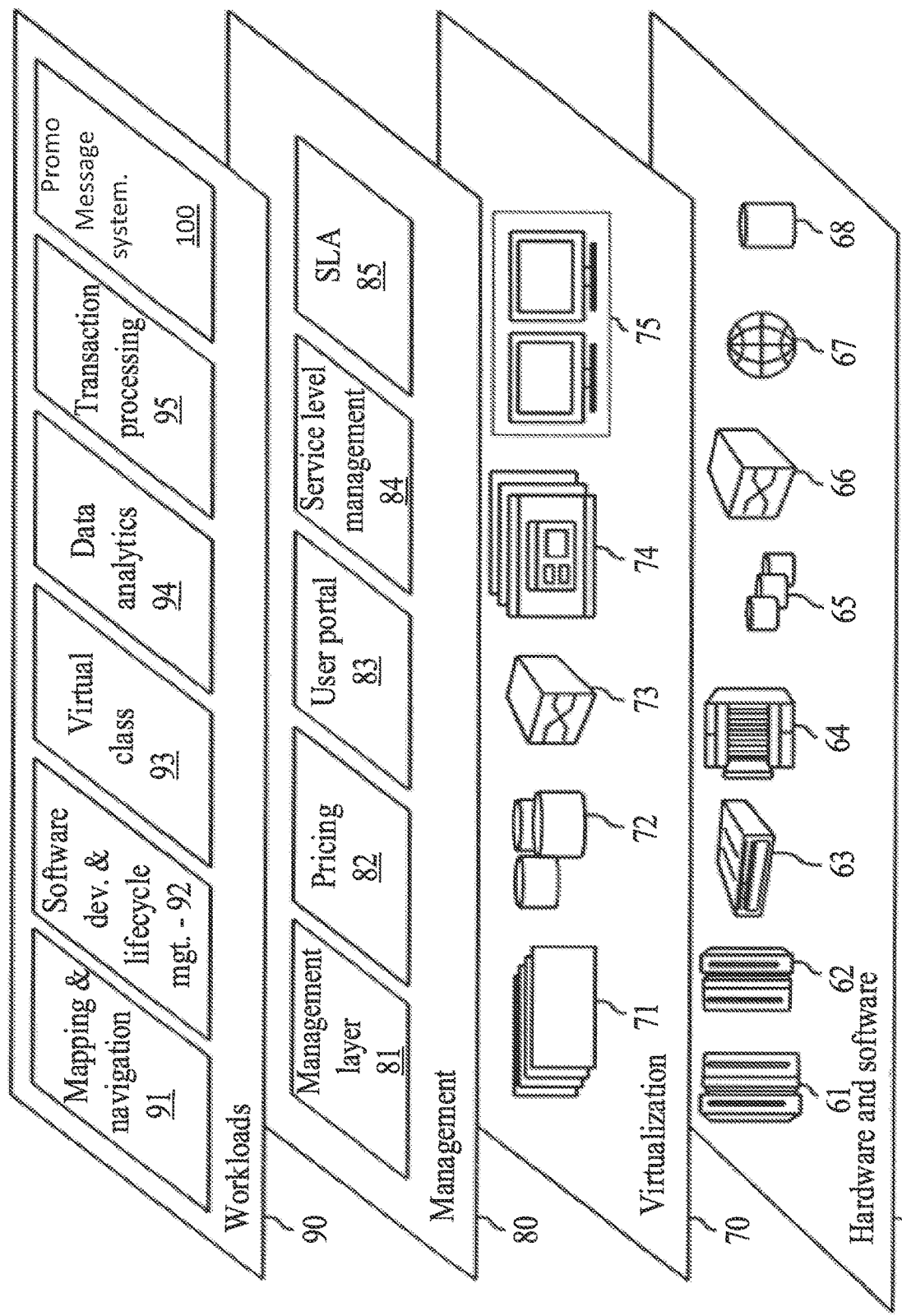
FIG. 6 depicts abstraction model layers according to an embodiment of the present disclosure.

Referring now to FIG. 6, a set of functional abstraction layers provided by cloud computing environment (see FIG. 5) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system for identifying caller details for promotional voice communications 96 in accordance with FIGS. 1-3.

Having described preferred embodiments of a system and method for identifying caller details for promotional voice call communications (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for providing origin information for promotional calls comprising:
   recording caller numbers, the caller numbers for parties making the promotional calls;
   recording from company providing promotions being sold a caller designation for a type of promotional call to be offered by the parties with the caller numbers, and the caller numbers of the parties that the company has designated to make the promotions with the promotional calls, wherein the caller designation is linked to the caller numbers, wherein the caller number designation is a caller ID name (CNAM) and the caller designation for the type of promotional call has an identifier that is added to the caller ID name (CNAM), wherein the identifier that is added to the caller ID name also includes an identity of a party offering the promotion that is different from an identity for the caller number;
   receiving subscriber numbers for receiving the promotional calls, wherein the subscriber numbers are stored in a database that also includes approved content for the promotional calls to be received by the subscriber;
   matching caller numbers and approved content for the subscriber with a call scrubber including a disturbed ledger, the distributed ledger recording the caller designation attached to the caller numbers indicative of the type for the promotional call; and
   receiving the promotional call by the subscriber, wherein the caller identification for the subscriber indicates both the caller numbers and the caller designation that is indicative of the type for the promotional call.

2. The computer-implemented method of claim 1, wherein matching caller numbers and approved content includes receiving do not disturb data from the originating access provider.

3. The computer-implemented method of claim 1, wherein the caller is a telemarketer.

4. The computer-implemented method of claim 1, wherein the caller designation that is indicative of the type for the promotional call includes the identity for the party that is providing the promotion for the promotional call.

5. The computer-implemented method of claim 4, wherein the promotion is goods for sale or services for sale.

6. The computer-implemented method of claim 1 further comprising feedback from the subscriber when the content of the promotion does not match the type for the promotional call.

7. The computer-implemented method of claim 6, wherein the feedback is used to update the distributed ledger to increase accuracy in the step of matching caller numbers and approved content.

8. A system for providing origin information for promotional calls comprising:
   a hardware processor; and
   a memory that stores a computer program product, which, when executed by the hardware processor, causes the hardware processor to:
   record caller numbers, the caller numbers for parties making the promotional calls;
   record from company providing promotions being sold a caller designation for a type of promotional call to be offered by the parties with the caller numbers, and the caller numbers of the parties that the company has designated to make the promotions with the promotional calls, wherein the caller designation is linked to the caller numbers, wherein the caller number designation is a caller ID name (CNAM) and the caller designation for the type of promotional call has an identifier that is added to the caller ID name (CNAM), wherein the identifier that is added to the caller ID name also includes an identity of a party offering the promotion that is different from an identity for the caller number;
   receive subscriber numbers for receiving the promotional calls, wherein the subscriber numbers are stored in a database that also includes approved content for the promotional calls to be received by the subscriber;
   match caller numbers and approved content for the subscriber with a call scrubber including a disturbed ledger, the distributed ledger recording a caller designation attached to the caller numbers indicative of a type for the promotional call; and
   send the promotional call from the caller to the subscriber, wherein the caller identification for the subscriber indicates both the caller numbers and the caller designation that is indicative of the type for the promotional call.

9. The system of claim 8, wherein matching caller numbers and approved content includes receiving do not disturb data from the originating access provider.

10. The system of claim 8, wherein the caller is a telemarketer.

11. The system of claim 8, wherein the caller designation that is indicative of the type for the promotional call includes the identity for the party that is providing the promotion for the promotional call.

12. The system of claim 8, wherein the promotion is goods for sale or services for sale.

13. The system of claim 8 further comprising feedback from the subscriber when the content of the promotion does not match the type for the promotional call.

14. The system of claim 13, wherein the feedback is used to update the distributed ledger to increase accuracy in the step of matching caller numbers and approved content.

15. A computer program product for providing origin information for promotional calls comprising a computer readable storage medium having computer readable program code embodied therewith, the program instructions executable by a processor to cause the processor to:
- record, using the processor, caller numbers, the caller numbers for parties making the promotional calls;
- record, using the processor, from company providing promotions being sold a caller designation for a type of promotional call to be offered by the parties with the caller numbers, and the caller numbers of the parties that the company has designated to make the promotions with the promotional calls, wherein the caller designation is linked to the caller numbers, wherein the caller number designation is a caller ID name (CNAM) and the caller designation for the type of promotional call has an identifier that is added to the caller ID name (CNAM), wherein the identifier that is added to the caller ID name also includes an identity of a party offering the promotion that is different from an identity for the caller number;
- receive using the processor, subscriber numbers for receiving the promotional calls, wherein the subscriber numbers are stored in a database that also includes approved content for the promotional calls to be received by the subscriber;
- match, using the processor, caller numbers and approved content for the subscriber with a call scrubber including a disturbed ledger, the distributed leger recording a caller designation attached to the caller numbers indicative of a type for the promotional call; and
- send, using the processor, the promotional call from the caller to the subscriber, wherein the caller identification for the subscriber indicates both the caller numbers and the caller designation that is indicative of the type for the promotional call.

16. The computer program product of claim 15, wherein matching caller numbers and approved content includes receiving do not disturb data from the originating access provider.

17. The computer program product of claim 15, wherein the caller is a telemarketer.

18. The computer program product of claim 15, wherein the caller designation that is indicative of the type for the promotional call includes the identity for the party that is providing the promotion for the promotional call.

19. The computer program product of claim 15, wherein the promotion is goods for sale or services for sale.

20. The computer program product of claim 15 further comprising feedback from the subscriber when the content of the promotion does not match the type for the promotional call.

* * * * *